US010490992B1

(12) United States Patent
Robertson

(10) Patent No.: US 10,490,992 B1
(45) Date of Patent: Nov. 26, 2019

(54) ELECTRICAL GROUND ROD INSTALLATION DEVICE

(71) Applicant: Kenneth D. Robertson, Jena, LA (US)

(72) Inventor: Kenneth D. Robertson, Jena, LA (US)

( * ) Notice: Subject to any disclaimer, the term of this patent is extended or adjusted under 35 U.S.C. 154(b) by 0 days.

(21) Appl. No.: 15/993,240

(22) Filed: May 30, 2018

Related U.S. Application Data

(60) Provisional application No. 62/603,389, filed on May 30, 2017.

(51) Int. Cl.
*H02G 13/00* (2006.01)
*H01B 5/02* (2006.01)

(52) U.S. Cl.
CPC .............. *H02G 13/80* (2013.01); *H01B 5/02* (2013.01); *H02G 13/40* (2013.01)

(58) Field of Classification Search
CPC ........ H02G 13/80; H02G 13/40; H02G 13/00; H02G 9/00; H01B 5/02; H01B 5/00; H01R 4/66; E02D 7/02; E02D 7/04; E02D 7/00
USPC .......... 174/6, 7, 5 R, 2, 3, 30; 439/100, 921; 361/212, 222; 175/1, 90, 91, 92; 227/147; 173/90, 91, 1
See application file for complete search history.

(56) References Cited

U.S. PATENT DOCUMENTS

| | | | | |
|---|---|---|---|---|
| 2,449,313 A * | 9/1948 | Naef | ........................ | H01R 4/66 174/6 |
| 4,688,969 A * | 8/1987 | Bruser | ..................... | H01R 4/66 174/7 |
| 5,086,849 A * | 2/1992 | Dahl | ........................ | E02D 7/04 173/90 |
| 5,248,002 A * | 9/1993 | Williams | ................. | H01R 4/66 173/1 |
| 6,040,522 A * | 3/2000 | Beggs | ...................... | H01R 4/66 174/5 SG |
| 6,364,031 B1 * | 4/2002 | Amicangelo | ............. | E02D 7/04 173/90 |
| 6,963,026 B2 * | 11/2005 | Brennan | .................. | H01R 4/66 174/3 |
| 7,121,357 B1 * | 10/2006 | Raimondi | ................ | H01R 4/66 173/1 |
| 7,282,637 B2 * | 10/2007 | Stockin | .................... | H01R 4/66 174/6 |
| 9,206,578 B1 * | 12/2015 | Rose | ........................ | E02D 7/04 |

OTHER PUBLICATIONS

Hilti USA, TE-S PD—Hammer Drill Bits (SDS), May 29, 2018, 1 page.

* cited by examiner

*Primary Examiner* — Angel R Estrada
(74) *Attorney, Agent, or Firm* — Jones Walker LLP

(57) ABSTRACT

An installation device for installing an electrical ground rod into the earth. The electrical ground rod installation device of the present invention may comprise a shaft connecting an upper housing to a base. A user may utilize the installation device to install an electrical ground rod by first sliding the ground rod through the base and into the upper housing. In this arrangement, the base will be adjacent to approximately the middle of the ground rod and thus be at a height that can be engaged by the user from the ground, thereby avoiding the inherent risks associated with using ladders to install ground rods.

8 Claims, 3 Drawing Sheets

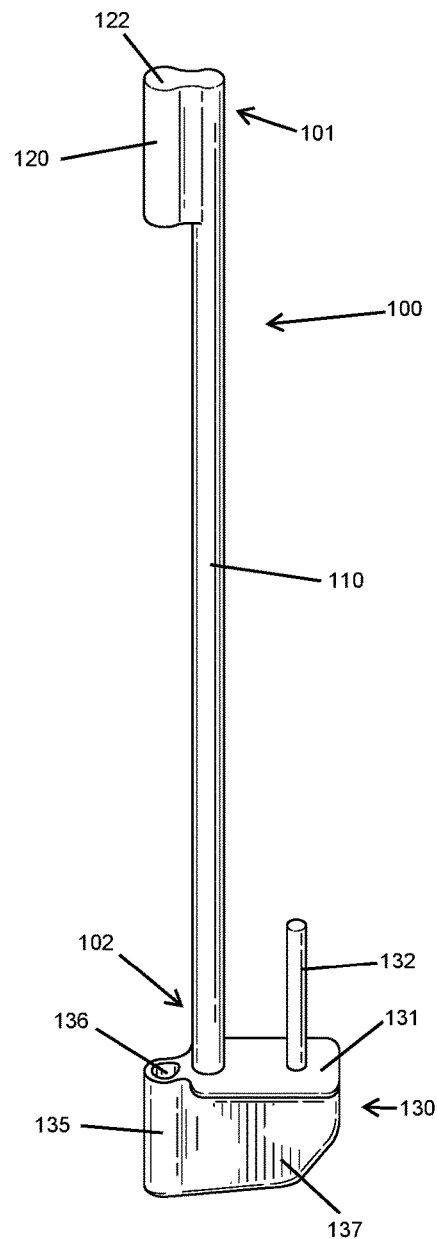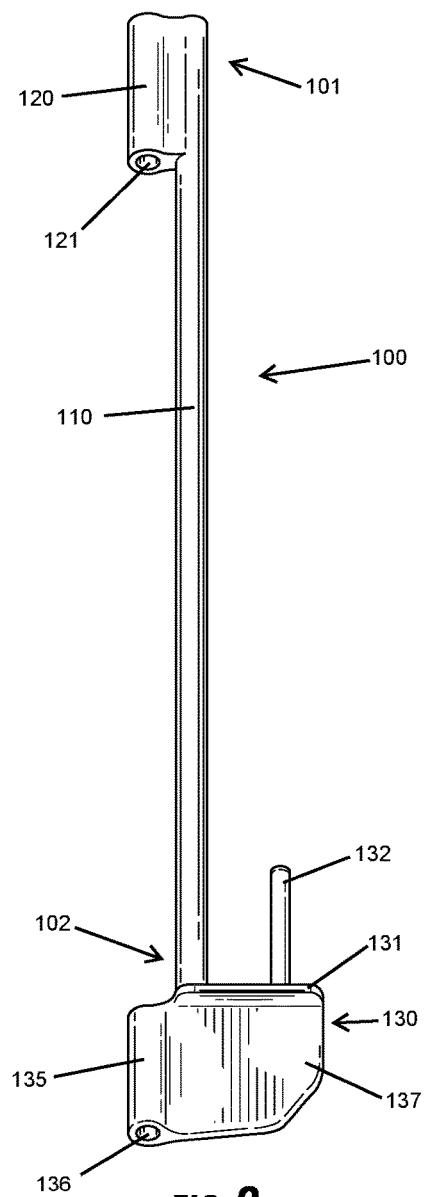

ELECTRICAL GROUND ROD INSTALLATION DEVICE

CROSS-REFERENCE TO RELATED APPLICATIONS

This application claims the benefit of U.S. Provisional Application No. 62/603,389, filed May 30, 2017, which is incorporated herein in its entirety by reference.

BACKGROUND

Electricity is transmitted from power stations to homes and businesses using a network of power lines, transformers, cables, and other equipment. The National Electrical Code mandates that grounding rods be installed into the earth and connected to the electrical network (typically at the utility pole) for several purposes, including: to protect people from electrical shock, help safeguard expensive electronic equipment, and limit neutral-to-ground voltage. The ground rod functions to provide an electrical path to dissipate a static discharge voltage (such as lightning) to earth.

In the United States, ground rod electrodes made of iron or steel must be at least 8 feet in length and have a diameter of at least ⅝ inch with the outer surface galvanized or otherwise metal-coated for corrosion protection. Ground rod electrodes made of stainless steel or nonferrous metals must be at least 8 feet in length and have a diameter of at least ½ inch.

Ground rods are often installed by driving them into the ground with an impact hammer or hydraulic ram. Regardless of the installation tool utilized, the length of the ground rod (8 ft or more) oftentimes mandates that the installer begin the installation process from an elevated position so that the installation tool can be coupled to the end of the ground rod. This typically requires the installer to use a ladder at the installation site, thus presenting a safety hazard for the installer.

SUMMARY

The installation device of the present invention is designed to removably couple to an electrical ground rod to provide a user a means for installing the ground rod while standing firmly on the earth, thereby avoiding the inherent risks associated with using ladders to install ground rods. In an exemplary embodiment employing the principles of the present invention, the electrical ground rod installation device comprises a shaft connecting an upper housing to a base. A user may utilize the installation device to install an electrical ground rod by first sliding the ground rod through a guide formed in the base and into the upper housing. In this arrangement, the base—which preferably features a drive plate and a vertical post attached thereto—will be adjacent to approximately the middle (lengthwise) of the ground rod and thus be at a height that can be engaged by the user without the need of a ladder. Once the ground is placed into the desired location for installation, the user can utilize a mechanical device, such as a hammer drill, to engage the base's vertical post to drive the ground rod into the earth.

The above summary is not intended to describe each illustrated embodiment or every possible implementation. It is not an exhaustive overview of the details disclosed herein. Nor is it intended to identify key or critical elements of the invention or to delineate the scope of the invention. These and other features, aspects, and advantages of the subject matter of this disclosure will become better understood in view of the following description, drawings, and claims.

BRIEF DESCRIPTION OF THE DRAWINGS

The accompanying figures, where like reference numerals refer to identical or functionally similar elements throughout the separate views, and which, together with the detailed description below, are incorporated in and form part of the specification, serve to illustrate and to explain various principles and advantages in accordance with the present invention:

FIG. 1 is a front perspective view of an embodiment of an electrical ground rod installation device exemplifying the principles of the invention;

FIG. 2 is a front perspective view of the exemplary embodiment of an electrical ground rod installation device depicted in FIG. 1;

DESCRIPTION

Figure 3:
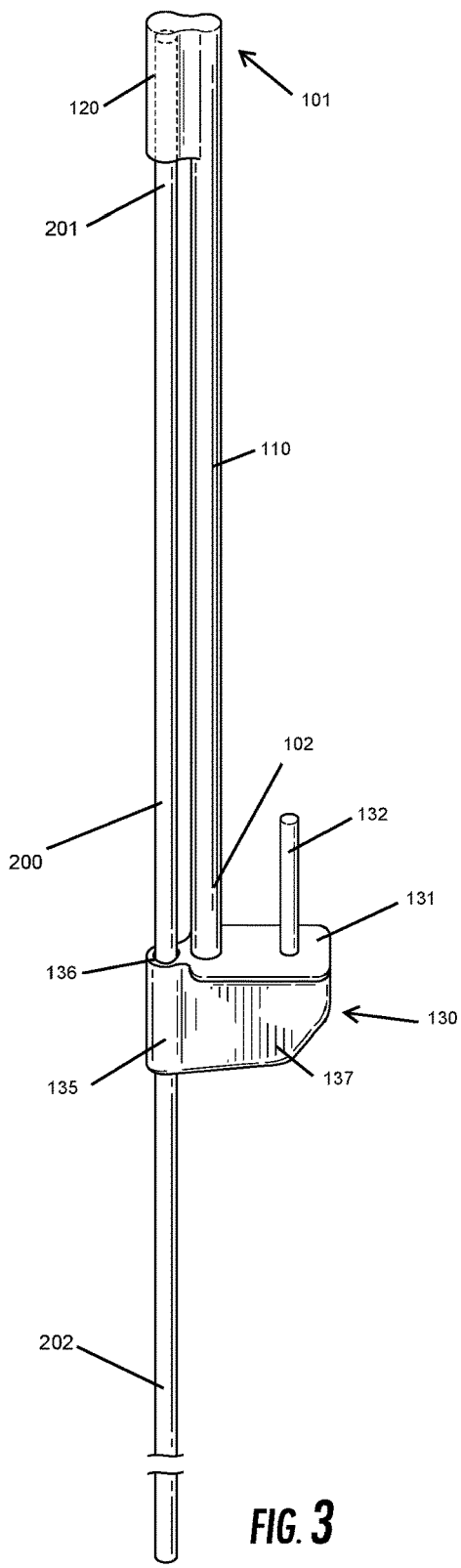
FIG. 3 is a front perspective view of the exemplary embodiment of an electrical ground rod installation device depicted in FIG. 1 whereby the installation device is mounted to a ground rod.

A novel installation device for an electrical ground rod is described herein. However, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Alternate embodiments may be devised without departing from the spirit or the scope of the invention. Further, the terms and phrases used herein are not intended to be limiting, but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

As used herein, the terms "a" or "an" are defined as one or more. The term "plurality," as used herein, is defined as two or more. The term "another," as used herein, is defined as at least a second or more. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including," "having," or "featuring," as used herein, are defined as comprising (i.e., open language). The term "coupled," as used herein, is defined as connected, although not necessarily directly, and not necessarily mechanically. As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Relational terms such as first and second, upper and lower, top and bottom, right and left, and the like may be used solely to distinguish one entity or action from another entity or action without necessarily requiring or implying any actual such relationship or order between such entities or actions.

Figure 4:
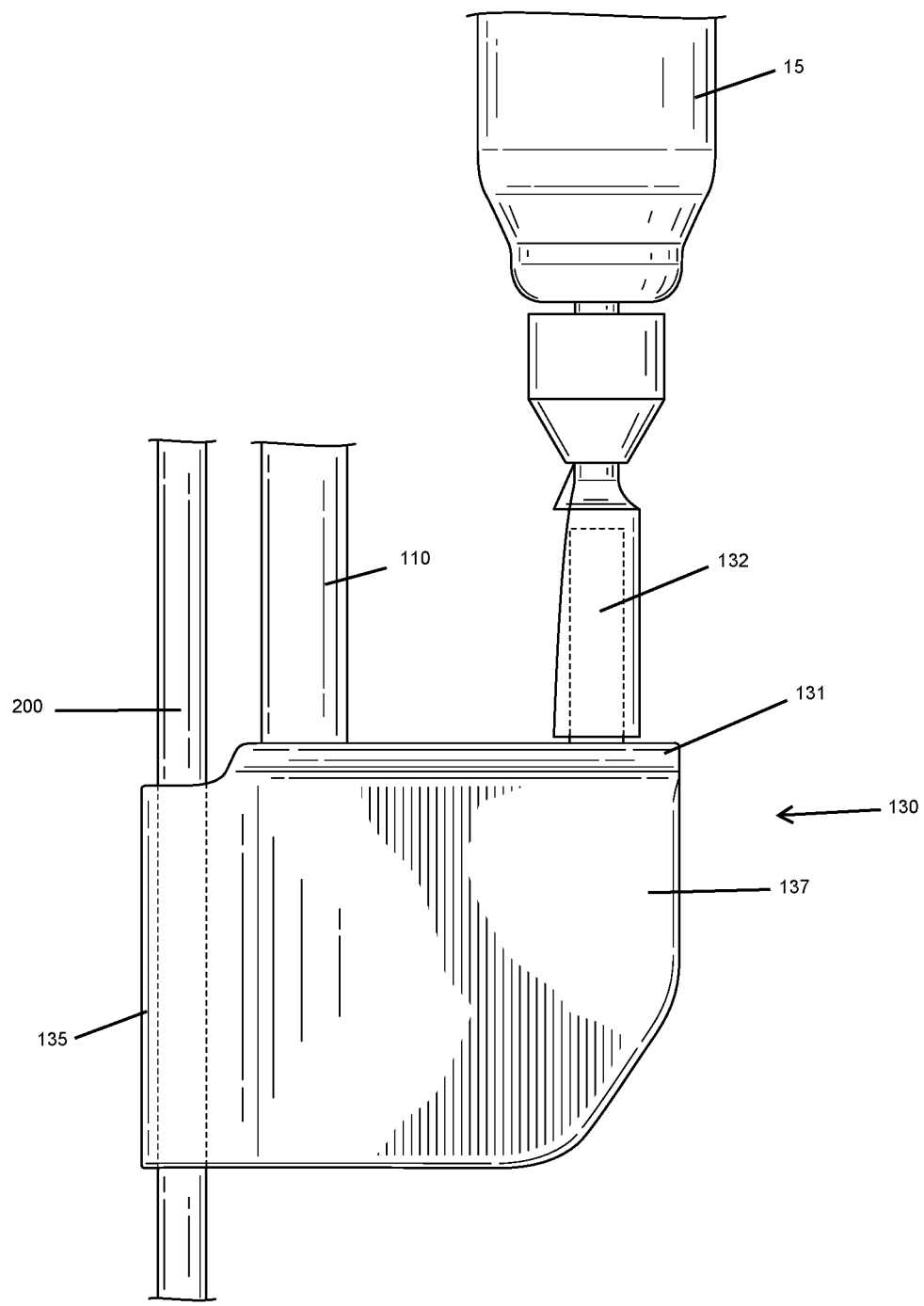
FIG. 4 is a front perspective view of the exemplary embodiment of an electrical ground rod installation device depicted in FIG. 1 whereby the installation device is mounted to a ground rod and an impact hammer is engaging the installation device.

Referring now to FIGS. 1-4, an exemplary embodiment of an electrical ground rod installation device 100 exemplifying the principles of the invention is shown. In the exemplary embodiment depicted in FIGS. 1-4, the electrical ground rod installation device 100 comprises a shaft 110 connecting an upper housing 120 to a base 130.

The shaft 110 may comprise a cylindrical rod having an upper portion 101 and a lower portion 102. In a preferred embodiment, the shaft 110 comprises a solid steel cylindrical rod having a diameter of approximately ¾ inches and a length of approximately 45 inches.

The upper housing 120 is attached to (or integrally formed with) the upper portion 101 of the shaft 110. The upper housing 120 may comprise a hollow tube having an internal cavity 121 and a cap 122. The internal cavity 121 is dimensioned such that it is capable of receiving an upper end 201 of a ground rod 200. In a preferred embodiment, the internal cavity 121 of the upper housing 120 has a length of approximately 4 inches and an inside diameter of approximately 1 inch. In certain embodiments, the cap 122 can be secured to the hollow tube of the upper housing 120 via welding. In other embodiments, the upper housing 120 can be constructed such that the cap 122 is integrally formed therewith.

The base 130 is attached to (or integrally formed with) the lower portion 102 of the shaft 110. The base 130 may comprise a driver plate 131, a vertical post 132, a guide 135, and optionally a brace 137. The driver plate 131 may be attached to the shaft 110 via welding or other known attachment means and preferably extends horizontally from the shaft 110 (i.e., at an angle 90° from the longitudinal axis of the shaft 110). In a preferred embodiment, the driver plate 131 is ¼ in. thick×2 in. wide×3⅜ in. long steel plate. The vertical post 132, which is adapted to be engaged by a mechanical device such as a hammer drill, rotary hammer, etc., preferably extends vertically from the top side of the driver plate 131 (i.e., at an angle 90° from the longitudinal axis of the driver plate 131). In a preferred embodiment, the vertical post 132 is a ⅝ in.×7 in. solid steel rod. The guide 135 functions in combination with the upper housing 120 to maintain the ground rod 200 in a substantially parallel orientation with the shaft 110 during installation. The guide 135 may comprise a hollow tube having a central, internal passage 136 through the longitudinal axis of the guide 135. The internal passage 136 is dimensioned such that it can receive ground rod 200 that is to be installed. In a preferred embodiment, the internal passage 136 of the guide 135 has a length of approximately 3 inches and an inside diameter of approximately ¾ inch. A brace 137 may be utilized to support the driver plate 131. A first portion of the brace 137 may be attached to the lower portion 102 of the shaft 110, with a second portion of the brace 137 attached to the underside of the driver plate 131. The components of the base 130 may be attached to one another via welding or other known attachment means.

In operation, a user may utilize the installation device 100 to install an electrical ground rod 200 by first sliding a first end 201 of the ground rod 200 through the internal passage 136 of the guide 135 and into the internal cavity 121 of the upper housing 120 such that the first end 201 of the ground rod 200 abuts the cap 122. The second end 202 of the ground rod 200 can then be placed into the desired location for installation. In this arrangement, and when an installation device 100 having preferred dimensions is employed, the base 130 will be approximately 4 feet above the earth, thereby negating the need for a ladder to initiate the installation process. The user can place the socket of the hammer drill 15 (or other mechanical driver) over the vertical post 132 while standing firmly on the ground. Once the ground rod 200 is driven into the earth to the point that the base 130 comes into contact with the earth (approximately 4 feet in a preferred embodiment), the user can then lift the installation device 100 vertically to disengage the installation device 100 from the ground rod 200. To complete the installation, the user can place the socket of the hammer drill 15 on the first end 201 of the ground rod 200 and drive the remainder of the ground rod 200 into the earth.

The foregoing description of the embodiments of the invention has been presented for purposes of illustration and description. It is not intended to be exhaustive or to limit the invention to the precise form(s) disclosed, and many modifications and other embodiments of the invention set forth in this disclosure will be appreciated by one skilled in the art having the benefit of this disclosure. The embodiments were chosen and described in order to explain the principles of the invention and its practical application to enable one skilled in the art to utilize the invention in various embodiments and with various modifications as are suited to the particular use contemplated. The embodiments shown in the drawings and described above are exemplary of numerous embodiments that may be made within the scope of the appended claims. It is contemplated that numerous other configurations may be used, and the material of each component may be selected from numerous materials other than those specifically disclosed.

What is claimed is:

1. A device for installing an electric ground rod, comprising:
   a) a rigid, elongated shaft having an upper portion and a lower portion;
   b) an upper housing attached to the upper portion of the shaft, the upper housing comprising a hollow tube having a central, internal cavity and a cap;
   c) a base attached to the lower portion of the shaft, the base comprising: (i) a driver plate attached to the shaft and extending horizontally therefrom; (ii) a vertical post attached to a top side of the driver plate and extending vertically therefrom; and (iii) a guide attached to the shaft, the guide comprising a hollow tube having a central internal passage through its longitudinal axis.

2. The device of claim 1, further comprising a brace having a first portion attached to the lower portion of the shaft and a second portion attached to an underside of the driver plate.

3. The device of claim 2, wherein the shaft further defines a first side and a second side directly opposite the first side, and wherein the upper housing and the guide are each attached to the first side of the shaft such that the internal cavity of the upper housing is aligned with the internal passage of the guide.

4. The device of claim 3, wherein the driver plate is attached to the second side of the shaft.

5. The device of claim 1, wherein the shaft comprises a cylindrical rod.

6. A method for installing an electric ground rod, comprising:
   a) providing an installation device comprising: (i) an elongated shaft having an upper portion and a lower portion; (ii) an upper housing attached to the upper portion of the shaft, the upper housing comprising a hollow tube having a central, internal cavity and a cap; and (iii) a base attached to the lower portion of the shaft, the base comprising: a driver plate attached to the shaft and extending horizontally therefrom; a vertical post attached to a top side of the driver plate and extending vertically therefrom; and a guide attached to the shaft, the guide comprising a hollow tube having a central internal passage through its longitudinal axis;
   b) inserting the ground rod through the central internal passage formed in the guide and into the internal cavity of the upper housing such that a first end of the ground rod abuts the cap;
   c) placing a second end of the ground rod into a desired location for installation;
   d) engaging the vertical post with a mechanical driving device to drive the ground rod into the earth.

7. The method of claim 6, further comprising the step of disengaging the installation device from the ground rod once the ground rod has been driven into the earth to a sufficient depth to cause the base of the installation device to be adjacent to the earth.

8. The method of claim 7, further comprising the step of engaging the first end of the ground rod with the mechanical driving device to drive the ground rod into the earth.

* * * * *